(12) United States Patent
Wang et al.

(10) Patent No.: US 7,963,153 B2
(45) Date of Patent: Jun. 21, 2011

(54) NON-DESTRUCTIVE AMBIENT DYNAMIC MODE AFM AMPLITUDE VERSUS DISTANCE CURVE ACQUISITION

(75) Inventors: Chikuang Charles Wang, San Jose, CA (US); Biao Liu, Sunnyvale, CA (US); Yuri S. Uritsky, Newark, CA (US)

(73) Assignee: Applied Materials, Inc., Santa Clara, CA (US)

( * ) Notice: Subject to any disclaimer, the term of this patent is extended or adjusted under 35 U.S.C. 154(b) by 631 days.

(21) Appl. No.: 11/954,858

(22) Filed: Dec. 12, 2007

(65) Prior Publication Data

US 2009/0139315 A1    Jun. 4, 2009

Related U.S. Application Data

(60) Provisional application No. 60/991,576, filed on Nov. 30, 2007.

(51) Int. Cl.
    *G01B 5/28*    (2006.01)
(52) U.S. Cl. .......................................................... 73/105
(58) Field of Classification Search .................. None
    See application file for complete search history.

(56) References Cited

U.S. PATENT DOCUMENTS

| | | | |
|---|---|---|---|
| RE36,488 E | 1/2000 | Elings et al. | |
| 6,038,916 A | 3/2000 | Cleveland et al. | |
| 6,079,254 A * | 6/2000 | Chen et al. ...................... | 73/105 |
| 6,244,103 B1 | 6/2001 | Berghaus et al. | |
| 7,204,131 B2 | 4/2007 | Adderton et al. | |
| 2007/0277599 A1 * | 12/2007 | Wang et al. ...................... | 73/105 |

OTHER PUBLICATIONS

Garcia, Ricardo et al., "Attractive and repulsive tip-sample interaction regimes in tapping-mode atomic force microscopy," *Physical Review B*, American Physical Society, vol. 60: No. 7 (Aug. 15, 1999) pp. 4961-4967.
Garcia, Ricardo et al., "Dynamic atomic force microscopy methods," *Surface Science Reports 47*, Elsevier Science B.V. (2002) pp. 197-301.
Martinez, Nicolas F. et al., "Measuring phase shifts and energy dissipation with amplitude modulation atomic force microscopy," *Nanotechnology 17*, Institute of Physics Publishing (2006) pp. S167-S172.
Wang, Chikuang, U.S. Appl. No. 11/421,396 entitled Atomic Force Microscope Technique for Minimal Tip Damage May 3, 2006, 31 pgs.

* cited by examiner

*Primary Examiner* — Robert R Raevis
(74) *Attorney, Agent, or Firm* — Blakely, Sokoloff, Taylor & Zafman

(57) ABSTRACT

A method, a system and a computer readable medium for dynamic mode AFM amplitude versus distance curve acquisition. In an embodiment, a constant force feedback mechanism is enabled prior to the first time an AFM probe tip contacts a sample. The feedback mechanism setpoint is iteratively reduced while at least phase and amplitude of the probe tip are recorded as a function of the relative z-height of a cantilever coupled to the probe tip. The feedback mechanism setpoint may be repeatedly swept between upper and lower bounds to average out drift between the cantilever and sample. Upon detecting a threshold, an absolute tip-to-sample distance is determined and correlated to the relative z-heights. The amplitude and phase data recorded prior to tip-sample contact is then determined as a function of absolute tip-to-sample distance.

19 Claims, 10 Drawing Sheets

NON-DESTRUCTIVE AMBIENT DYNAMIC MODE AFM AMPLITUDE VERSUS DISTANCE CURVE ACQUISITION

CROSS REFERENCE TO RELATED APPLICATIONS

This application claims the benefit of U.S. Provisional Application No. 60/991,576, filed Nov. 30, 2007, which is hereby incorporated by reference.

BACKGROUND

1) Field of the Invention

Embodiments of the present invention generally relate to a method of using an atomic force microscope (AFM), and more particularly to methods of acquiring amplitude versus distance measurement curves.

2) Description of Related Art

The surface properties of thin films can be measured by an atomic force microscope (AFM) operated in static or dynamic mode. In amplitude modulated (AM) dynamic mode, operation the AFM tip (probe) is typically vibrated or oscillated at a fixed frequency that is at or near the cantilever resonance frequency (reference). The amplitude and phase of the tip vibration is monitored by a detection mechanism as electronics controls the positioning of the tip relative to the sample surface. The measurable affect of the sample surface on the monitored probe tip is an output of AFM measurement.

Generally, as shown in FIG. 1, when an AFM tip gradually approaches a sample surface, the tip enters a van der Waal force field in a non-contact attractive force regime. Other attractive force fields, such as magnetic, capacitive, electric, friction, lateral, and capillary (mediated by a condensing vapor such as water) fields may also be measured with a tip so adapted. For clarity, the discussion of embodiments herein is focused on the van der Waal force, but it should be apparent that the present invention may be readily adapted to other attractive forces. Due to the attractive force field, the oscillating amplitude monotonically decreases with decreasing tip-to-sample distance. The phase signal also monotonically decreases (or increases, depending on the implementation of the phase detection electronics). Further reduction of the tip-to-sample distance will cause hard contact between the tip and the sample surface along with an abrupt and sharp reversal of the phase. The hard contact is first intermittent, occurring only during maximum tip displacement, but may become constant if the tip becomes embedded or otherwise captured by the sample surface.

During a non-contact surface scan, amplitude or phase modulation due to tip-to-sample interactions are maintained at a near constant value by a feedback control mechanism as an electrical or electromechanical apparatus scans the tip laterally across the surface. While scanning generally parallel to the sample surface, the feedback electronics are provided with an amplitude reference signal or a phase reference signal termed the feedback setpoint. The feedback mechanism attempts to maintain the actual tip oscillating amplitude or phase at the feedback setpoint by driving the cantilever vertically up and down in an effort to follow the contour of the sample surface topography and thereby maintain a constant tip-to-sample distance. It is desirable to operate this constant feedback setpoint at a value such that a pure non-contact attractive interaction between the tip and the sample is ensured, thus preventing the AFM tip from even momentarily making hard contact with the sample surface. Such hard contact usually causes AFM tip damage and results in loss of measurement accuracy and precision. Therefore, prior to scanning, a critical feedback setpoint where the onset of hard contact occurs should be determined precisely. The AFM will then typically be operated at either an amplitude setpoint or phase setpoint corresponding to a tip-to-sample distance that is nominally greater than the tip-to-sample distance corresponding to the critical phase setpoint or critical amplitude setpoint to ensure non-contact attractive interaction between the tip and the sample.

The range of tip vibration amplitude (or phase) that encompasses the onset of van der Waal (or other attractive force) interaction and the onset of hard contact depends on the initial free space vibration amplitude of the cantilever, the vibration frequency, tip material, sample material and other properties (such as stored electrical charges on insulating surfaces). The precise determination of this range will ensure that the AFM be operated in a non-contact (or attractive) regime and reduce the tip wear. In general, the most influencing factor is the cantilever vibration amplitude. At small vibration amplitude, this range, in a relative sense, can be large. While at large vibration amplitude, this range can shrink to zero and, when tip is close enough to the surface, it will bypass the van der Waal interaction and jump to hard contact almost immediately. It is also important to determine the change of vibration amplitude and phase as functions of absolute tip-to-samples distance in the van der Waal (or attractive force) regime, because such information provides valuable information of the interaction force between the tip and the sample. However, conventional method of obtaining both critical set point and functional relationships between amplitude/phase and absolute tip-to-sample distance frequently results in tip damage, as further described below.

Both FIG. 2a and FIG. 2b were obtained using the conventional method that caused the damage of AFM tip. Nevertheless, both figures still illustrate the transition from non-contact (attractive force) regime to hard contact regime of the broken tip unambiguously. FIG. 2a shows the AFM tip vibration amplitude versus relative tip-to-sample distance with an arbitrary 0 reference point. In the illustrated example, it can be seen that when the vibration amplitude is smaller than 3.4 nm, (correspondingly the relative tip-to-sample distance is smaller than 11 nm), the tip amplitude starts to decrease more rapidly with the reduction of tip-to-sample distance, signaling the beginning of the van der Waal interaction. The small deviation from the monotonic decreasing relationship occurs at the tip amplitude 0.4 nm. The arrow 202 in FIG. 2a points to the tip-to-sample distance where hard contact between the tip and the sample is thought to occur. An abrupt change in phase can also be used to determine the onset of intermittent hard contact between the tip and the sample. FIG. 2b illustrates the phase versus tip-to-sample distance relationship, and again, the arrow 212 in the figure points to where the onset of hard contact between the tip and the sample is thought to occur. Both curves can also be used to establish the functional relationships of amplitude and phase versus absolute tip-to-sample distance. The absolute zero tip-to-sample distance occurs at 6.4 nm in X scale in both graphs, where both amplitude and phase become 0.

Generally, the conventional approach to generate the curves shown in FIGS. 2A and 2B, is to: 1) perform AFM tip approach to the sample surface and stop tip approach at the proximity of sample surface; 2) with the feedback mechanism disabled, advance and retract tip repeatedly and record the amplitude and phase signals simultaneously; 3) establish the tip vibration characteristics corresponding to the point of surface contact as the critical feedback setpoint to be used during a subsequent scanning measurement and establish the functional relationships of amplitude and phase versus absolute tip-to-sample distance. Thus, this conventional method advances and retracts the AFM tip towards and away from the sample surface repeatedly without any feedback mechanism enabled while monitoring the amplitude and phase signals of the AFM tip vibration. From the resulting curves shown in FIG. 2A and FIG. 2B, the amplitude and phase signals corresponding to the point of contact are then assigned the critical feedback setpoints. However, during the conventional method, the tip is repeatedly rammed into the sample surface and the tip will likely be damaged. Due to tip damage, the critical setpoint established from the method may be grossly inaccurate as may be any subsequent measurements reliant on the F/D relationships deduced from the amplitude and phase measurements during the non-contact regime calibration. For example, when the feedback mechanism is enabled during subsequent AFM scanning operations, the critical setpoint employed as identified with the conventional method may have an unknown offset and the tip may be damaged in a manner reducing tip lifetime and/or measurement efficacy. Also, the functional relationships of amplitude and phase versus absolute tip-to-sample distance are those of the broken tip and the sample surface instead of the virgin non-damaged tip and sample surface.

SUMMARY

A method, a system and a computer readable medium for dynamic mode AFM amplitude versus distance curve acquisition are described herein.

In an embodiment, a constant force feedback mechanism is enabled during a tip approach routine. In one such embodiment this tip approach routine is performed prior to the first time the AFM probe tip contacts a particular sample. In a further embodiment, the data collected during tip approach with the feedback mechanism is utilized to obtain amplitude and phase data versus tip-to-sample distance curves in the attractive interaction regime without damaging the AFM probe tip.

In an embodiment, the feedback mechanism setpoint is iteratively reduced while phase and/or amplitude of the probe tip are recorded as a function of a relative distance (cantilever z-height) prior to the tip ever contacting the sample surface and then correlate the collected data to an absolute distance (tip-to-sample distance) upon identifying a critical feedback setpoint where the probe tip contacts the sample. In one embodiment the threshold is a phase reversal. In one such embodiment, the threshold corresponds to the condition where the probe tip initiates intermittent contact with the sample such that the relative z-height corresponding to the threshold may be calibrated to an absolute tip-to-sample distance equal to approximately one half of the tip vibration amplitude at the threshold.

In an embodiment, the data recorded as a function of relative z-height prior to the tip making contact with the sample is subsequently calibrated to the tip-to-sample distance to obtain an amplitude versus tip-to-sample distance curve. In a further embodiment, a phase versus tip-to-sample distance curve is also obtained.

In another embodiment, the feedback mechanism setpoint may be swept between an upper and lower bound one or more times to average out drift between the cantilever and sample. In one such embodiment, the upper bound of the sweep is approximately equal to the onset of van der Waal force and the lower bound is no less than the critical setpoint corresponding to the onset of intermittent contact. The data collected during the sweep as a function of cantilever z-height is then curve fit or otherwise averaged to reduce the effect of drift between the cantilever and sample surface on force/distance (F/D) curves.

In another embodiment, the feedback mechanism setpoint sweep is performed between an upper and lower bound wherein the lower bound is iteratively reduced with each sweep until a threshold, such as a phase threshold, is met. The amplitude and phase data recorded prior to tip-sample contact is then determined as a function of absolute tip-to-sample distance.

DETAILED DESCRIPTION

A method, a system and a computer readable medium for dynamic mode AFM amplitude versus distance curve acquisition are described herein. In the following description, numerous specific details are set forth, such as order of operations, in order to provide a thorough understanding of the present invention. It will be apparent to one skilled in the art that the present invention may be practiced without these specific details. In other instances, well-known features, such as specific AFM techniques, are not described in detail in order to not unnecessarily obscure the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments. Furthermore, it is to be understood that the various exemplary embodiments shown in the Figures are merely illustrative representations and are not necessarily drawn to scale.

Figure 1:
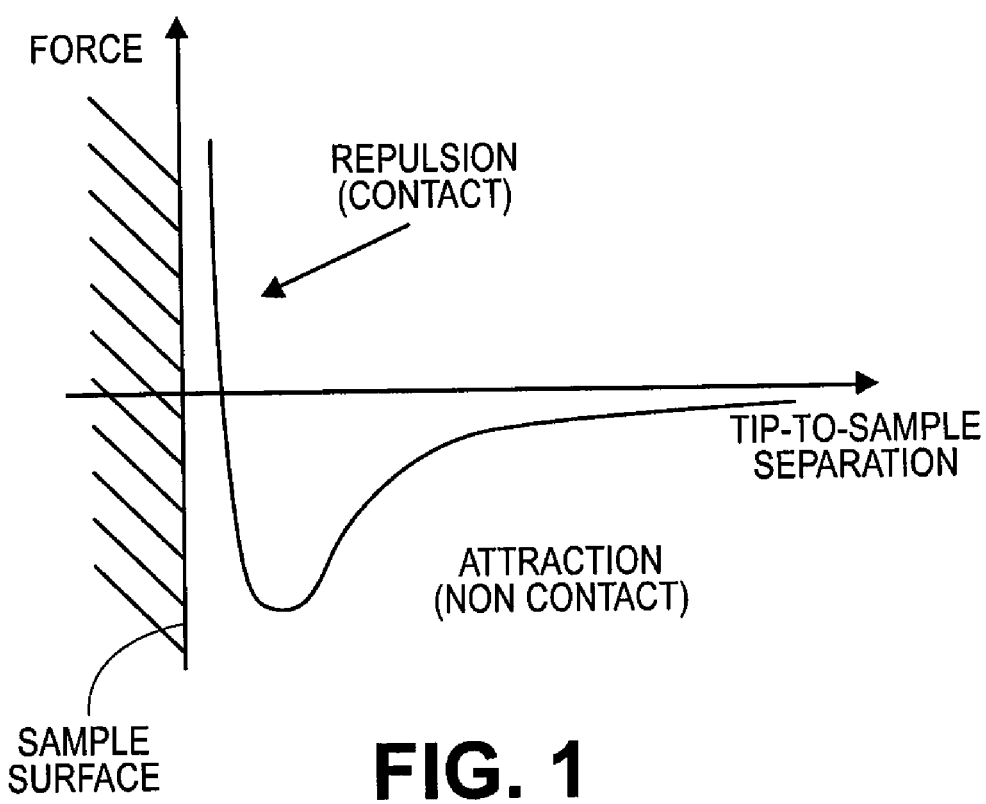
FIG. 1 is a representative inter-molecular force curve illustrating a shift from an attraction regime to a repulsion regime with decreasing distance between molecules.
Figure 2A:
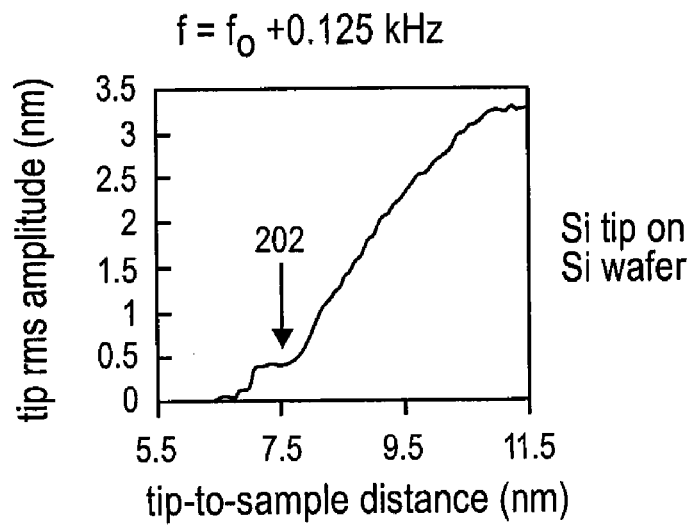
FIG. 2a is a graph of tip rms amplitude as a function of tip-to-sample distance in nanometers during tip approach to a surface illustrating a monotonic decrease in amplitude with decreasing tip-to-sample distance until intermittent hard contact between the tip and the sample surface occurs.
Figure 2B:
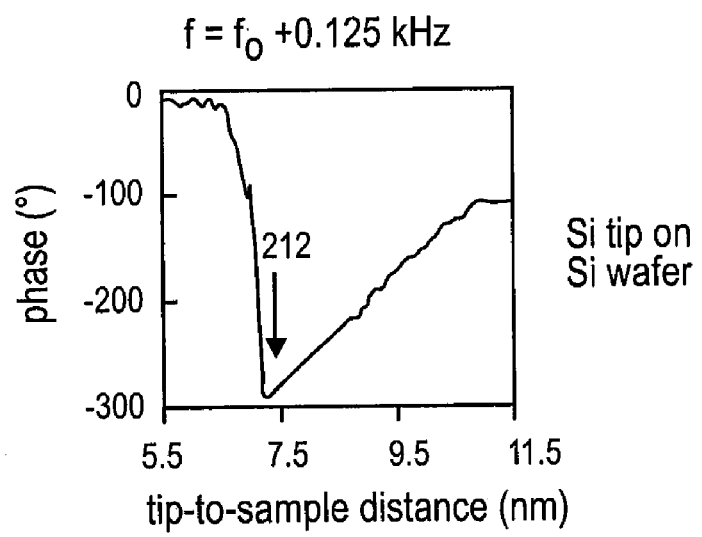
FIG. 2b is a graph of phase in degrees as a function of tip-to-sample distance in nanometers during tip approach to a surface illustrating a monotonic change in phase with decreasing tip-to-sample distance until intermittent hard contact between the tip and the sample surface occurs coinciding with an abrupt change in phase.
Figure 3:
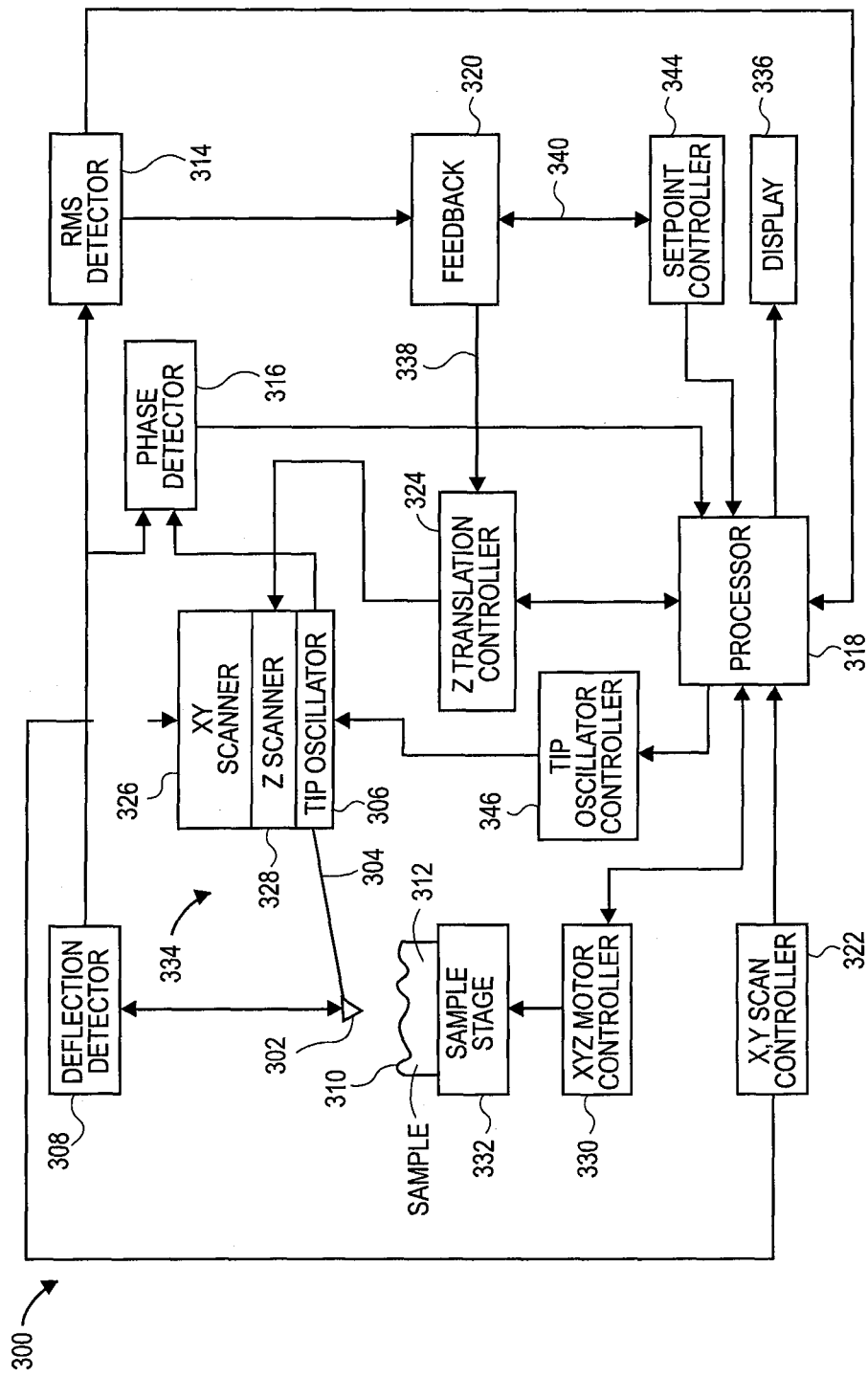
FIG. 3 is a simplified functional block diagram of an AFM including a probe/sample positioning apparatus and a feedback system using an amplitude feedback setpoint in accordance with one embodiment of the present invention.

FIG. 3 is a simplified functional block diagram of an atomic force microscope 300 for dynamic mode operation including a probe/sample positioning apparatus and a feedback system using an amplitude feedback setpoint 340 in accordance with one embodiment of the present invention. A phase feedback setpoint (not shown) may be employed in other embodiments of the invention, although this description will focus primarily on an amplitude feedback setpoint 340 to maintain consistency and avoid confusion.

A probe tip 302 on the end of a cantilever 304 may be oscillated at a known free oscillation amplitude and frequency at or near the cantilever resonant frequency by a tip oscillator 306. The cantilever resonant frequency may be around 300 kHz, and therefore, the tip 302 may be oscillated at a free oscillation frequency of 300.125 kHz during dynamic mode operation. For some embodiments, a tip oscillator controller 346 may be programmed with the desired free oscillation amplitude and frequency, or the tip oscillation may be controlled directly by a processor 318.

The amplitude of the tip oscillation may be sensed by a deflection detector 308, possibly via optical perturbations, as part of a deflection mechanism (not shown in its entirety). For optical deflections, the deflection mechanism may comprise any suitable means of light generation, such as a laser or LED light, in an effort to bounce the light off the back of the cantilever. The deflection detector 308 for detecting this deflected light may be a position-sensitive light detector or a laser interferometer. For some embodiments, the deflection detector 308 may comprise a piezo resistance sensor, a capacitive sensor, or a magnetic sensor, for example, thereby providing a corresponding feedback signal indicative of the particular type of attractive force being sensed. In either case, the deflection detector 308 may convert the deflection signals into electrical signals for further processing and recording.

Electronics (e.g. an rms detector 314 and a phase detector 316) may measure the amplitude and phase response of the sensed tip deflections. In FIG. 3, the detected phase is sent directly to the processor 318. For some embodiments, the phase detector 316 may also measure the phase of the free oscillation and output a phase difference, or both the detected signal phase and the free oscillation signal phase may be sent to the processor 318. The rms detector 314 may convert the detected signal amplitude into a DC voltage that may be sent to the processor 318. This converted amplitude may also then be used as a feedback signal 338, an input to a feedback mechanism 320 for a portion of the probe/sample positioning apparatus.

The probe/sample positioning apparatus may comprise an xy scan controller 322, a z-translation controller 324, an xy scanner 326, a z scanner 328, an xyz motor controller 330, and a sample stage 332. Combinations of these may move either a probe assembly 334 or the sample 312, whereby the probe assembly 334 may comprise at a minimum the cantilever 304, the tip 302, the tip oscillator 306, and the deflection detector 308. For some embodiments, the xyz motor controller 330 may be capable of moving the sample stage 332 along all three axes, thereby providing xy scanning and a coarse adjustment mechanism for z-travel of the sample 312, which normally is disposed atop the sample stage 332 during use of the AFM 300. The xy scan controller 322 may regulate the lateral movement of the probe assembly 334 in the xy plane during scanning or any other time it is necessary to move the probe assembly 334 laterally and may send instructions to the xy scanner 326 for actual motion. The z-height translation controller 324 may direct the movement of the probe assembly 334 up and down in relation to the surface 310. Z-height translation control may be based on the feedback signal 338 and a feedback setpoint 340. Fine adjustment of the probe z-height is provided by the z scanner 328, which receives commands from the z-height translation controller 324. The fine adjustment mechanism of the z scanner 328 may comprise a piezo stack or piezo tube. The AFM head assembly may also be mounted on electrical motor (or other coarse approach mechanism) driven Z-translation stage for coarse approach of tip to sample.

The processor 318 may monitor and/or control the xy scan controller 322, the z translation controller 324, the detected phase or phase difference from the phase detector 316, the detected rms amplitude from the rms detector 314, and a setpoint controller 344. For some embodiments, the processor 318 may output the elements necessary for a topographic image (or surface roughness measurement), phase imaging, phase vs. setpoint graphing, phase vs. tip-to-sample distance graphing (calibrated z translation control signal), rms amplitude vs. tip-to-sample distance graphing (calibrated z-translation control signal), or phase vs. setpoint graphing to a display 336 and/or a storage media device (not shown).

In the amplitude feedback configuration of FIG. 3, enabling the feedback mechanism 320 allows for closed loop control of the AFM tip-to-sample distance. The feedback mechanism 320 may send a signal to the z translation controller 324 in an effort to keep the feedback setpoint 340 and the feedback signal 338 at the same value, thereby operating the AFM 300 in a constant force mode. Those skilled in the art of atomic force microscopy will appreciate that in constant force mode, or height mode as it sometimes referred to, the probe assembly 334 or sample 312 is moved up and down in response to changes in force detected by the tip 302. The positioning apparatus may then alter the tip-to-sample distance to restore the force to the feedback setpoint 340. If a proper feedback setpoint 340 is selected corresponding to a correctly determined critical feedback setpoint value for a given type of probe tip 302, then the atomic force microscope 300 may operate in the non-contact attractive regime and avoid tip damage while imaging a surface. As mentioned previously, embodiments may incorporate a feedback mechanism 320 using either or both a phase feedback setpoint or an amplitude feedback setpoint.

Figure 4:
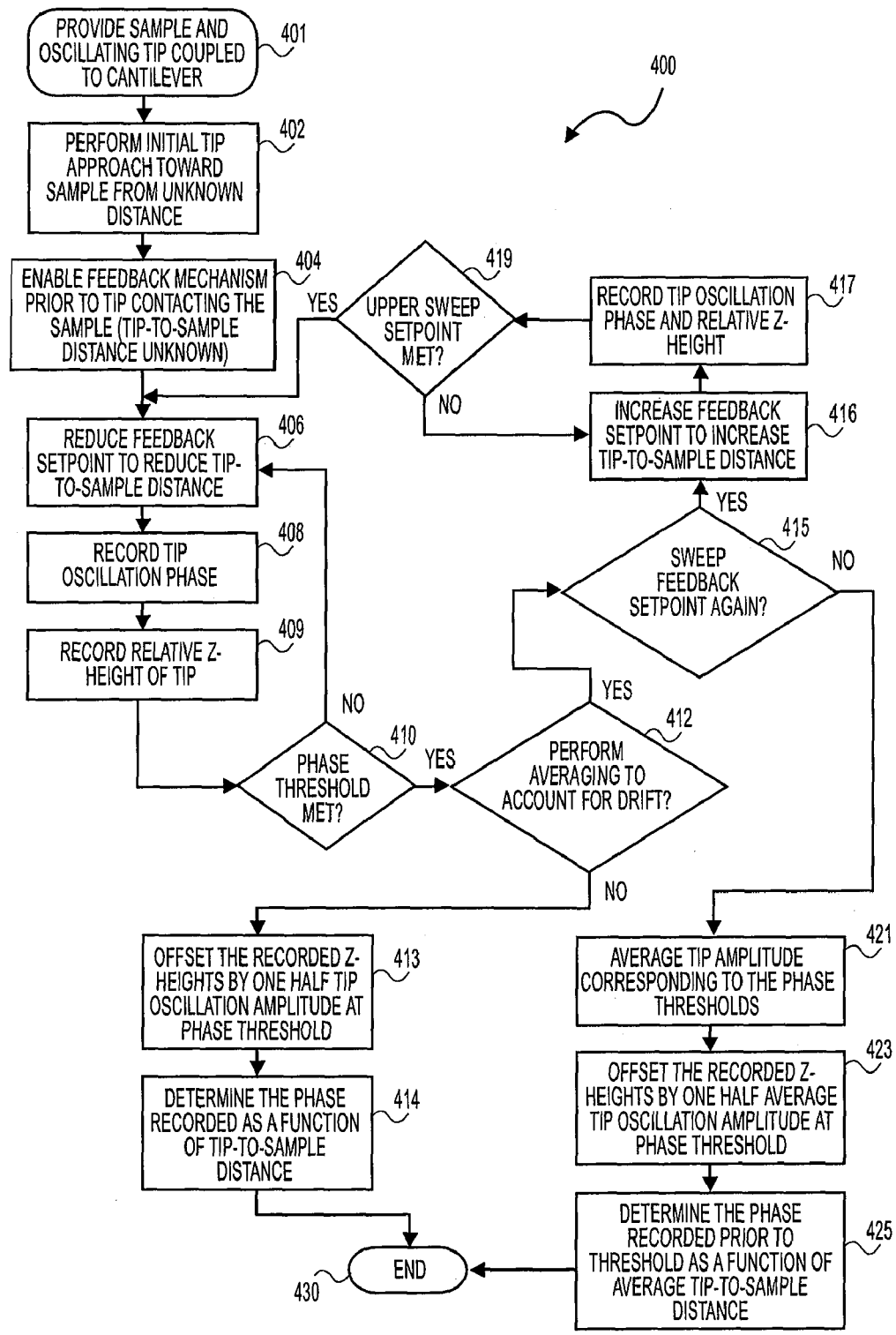
FIG. 4 is a flow chart depicting the determination of a feedback setpoint using the AFM while monitoring a tip vibration phase signal and a cantilever z-height according to one embodiment of the present invention.

FIG. 4 is a flow chart 400 depicting the automatic determination of the critical feedback setpoint using the atomic force microscope 300 while monitoring a phase signal from the phase detector 316 and a z-height from the z-translation controller 324, according to one embodiment. The operations described herein may be performed, for example, by the processor 318 and setpoint controller 344 as part of a calibration routine for a given tip/sample combination.

The flow chart 400 begins at operation 401, with a sample, such as sample 312 in FIG. 3, provided on a stage of an AFM. A probe tip coupled to a cantilever is made to oscillate.

At operation 402, an initial coarse tip approach may be performed. As part of the initial tip approach operation, the AFM probe tip 302 may be brought closer to the sample surface 310 while feedback mechanism 320 is turned off. For some embodiments, during the tip approach operation, the tip 302 is moved in a z-direction relative to the sample 312 and in other embodiments the sample 312 is moved in a z-direction relative to the tip 302. The tip approach begins with the tip 302 an unknown distance away from the sample 312. During the tip approach, the tip 302 should preferably be kept outside of the van der Waal force field, far enough away that it continues to oscillating at the free oscillation amplitude and frequency known for the particular tip assembly. To prevent the tip 302 from crashing onto the surface 310 of the sample 312 during the initial approach operation 402, the detector amplitude or phase signal may be monitored during the approach.

Figure 5A:
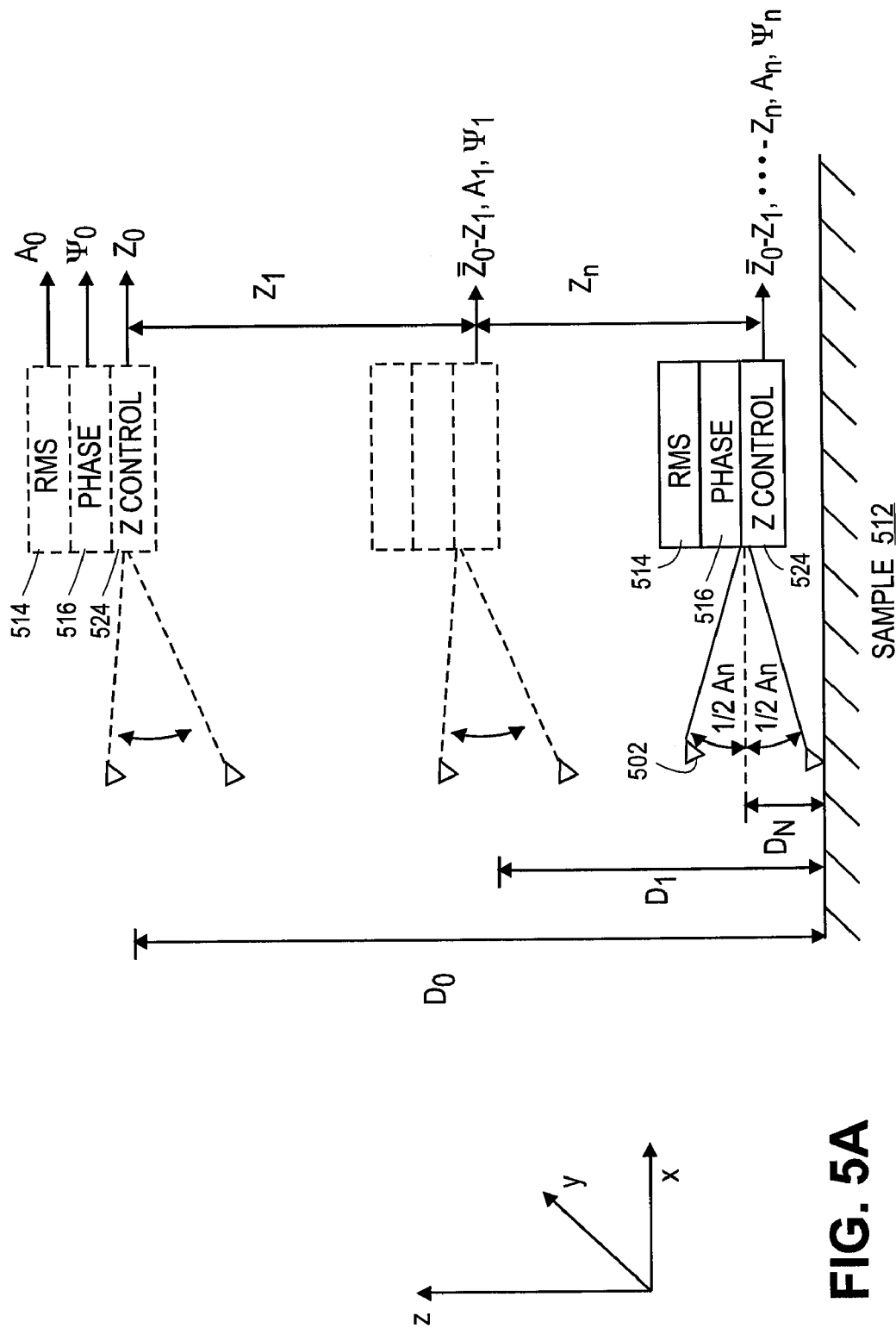
FIG. 5A is a simplified graphical representation of a side view an AFM tip and cantilever approaching a sample surface while monitoring a tip vibration phase and amplitude and a cantilever z-height according to one embodiment of the present invention.
Figure 5B:
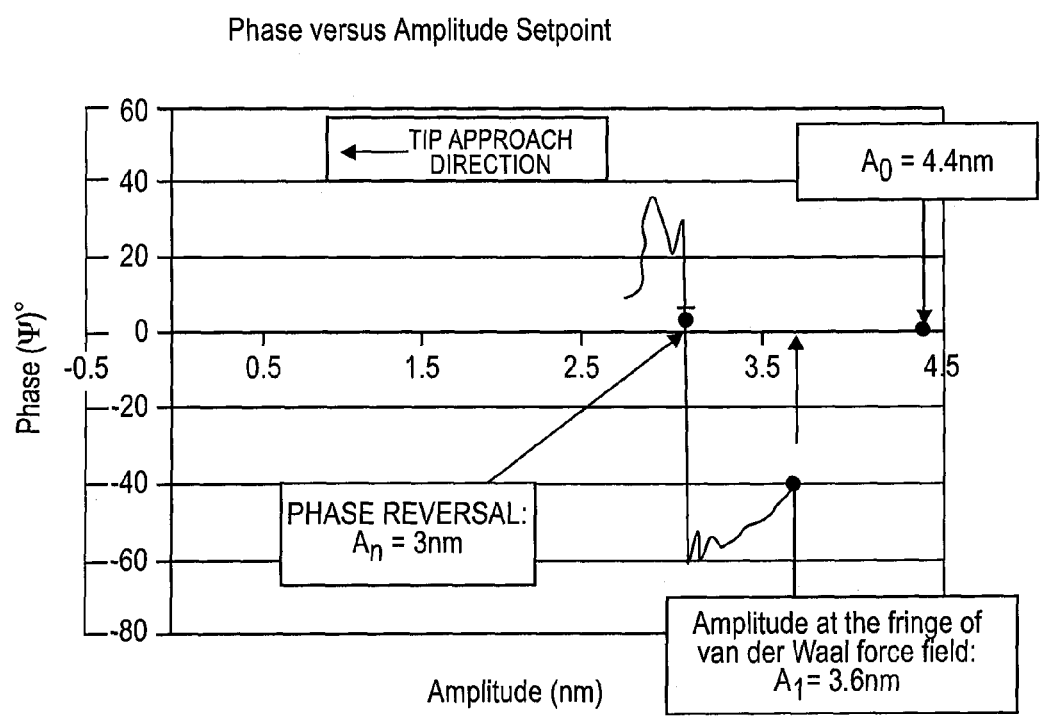
FIG. 5B is a graph of phase in degrees as a function of amplitude feedback setpoint in nanometers for a specific tip/sample combination at a particular free oscillation amplitude corresponding to the approach depicted in FIG. 5A, according to one embodiment of the present invention.

In one embodiment, the initial coarse approach is stopped at a tip-to-sample distance where there begins a reduction in tip amplitude relative to the free oscillation amplitude. This point may represent the onset of the a phenomenon known as air foil damping and, as shown in FIG. 5A, occurs when the probe tip oscillates about a point that is at a distance Do from the surface of the sample 512. The air foil is a layer of air between a bottom surface of the cantilever 304 and the sample surface 310. The vibrating cantilever 304 may transfer energy to the air foil through the compression and expansion of the air trapped between the two surfaces. This effect, called air foil damping, can serve to reduce the amplitude of the vibrating cantilever 304. Air foil damping may have a longer range and a more gradual effect on the vibrating cantilever 304 than the van der Waal forces and other non-contact attractive forces as a function of tip-to-sample distance. In an embodiment, at the distance $D_0$, the oscillation amplitude, $A_0$, and oscillation phase $\Psi_0$ is output from the rms detector 514 and phase detector 516, respectively, each as a function of a relative cantilever z-height from z-translation controller 524. As shown in FIG. 5B, the oscillation phase $\Psi_0$ may be plotted as a function of detected amplitude or setpoint amplitude, $A_0$. The detected magnitude of $A_0$ may be only slightly less (e.g. 10%, 1%, etc.) than the free oscillation amplitude. Depending on the strength of the response between the tip and sample, the detection signal to noise ratio, and the amplitude reduction threshold, etc., the location of $D_0$ may vary. Thus, in this embodiment, during the initial tip approach operation 404, the tip moves toward the sample to the unknown distance from the sample, $D_0$. As shown in FIG. 5B, because the tip is approaching from right to left, the minimum amplitude setpoint before the sample is surface is contacted is unknown.

Figure 7B:
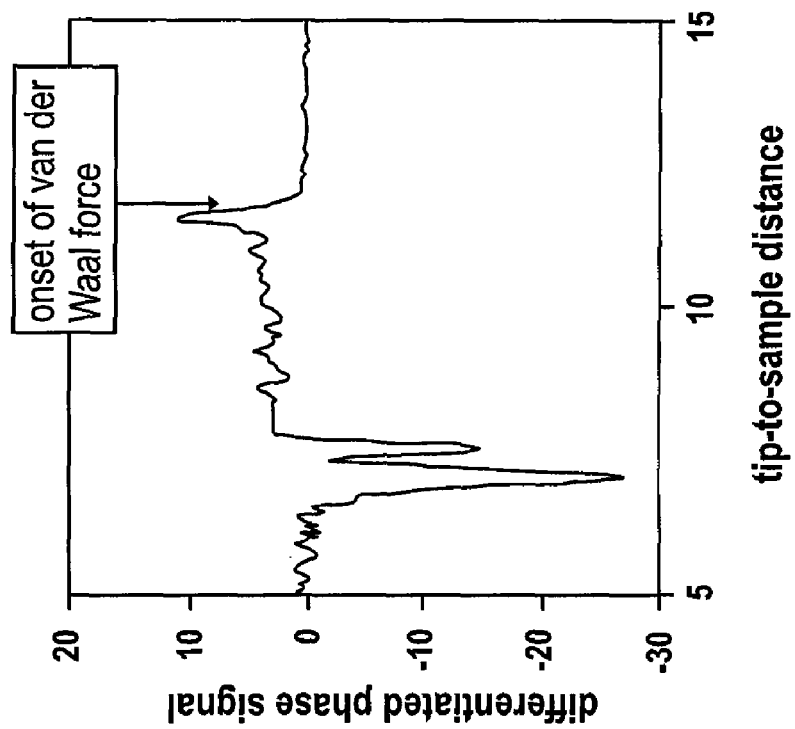
FIG. 7B illustrates a differentiated phase signal in accordance with an embodiment.
Figure 7A:
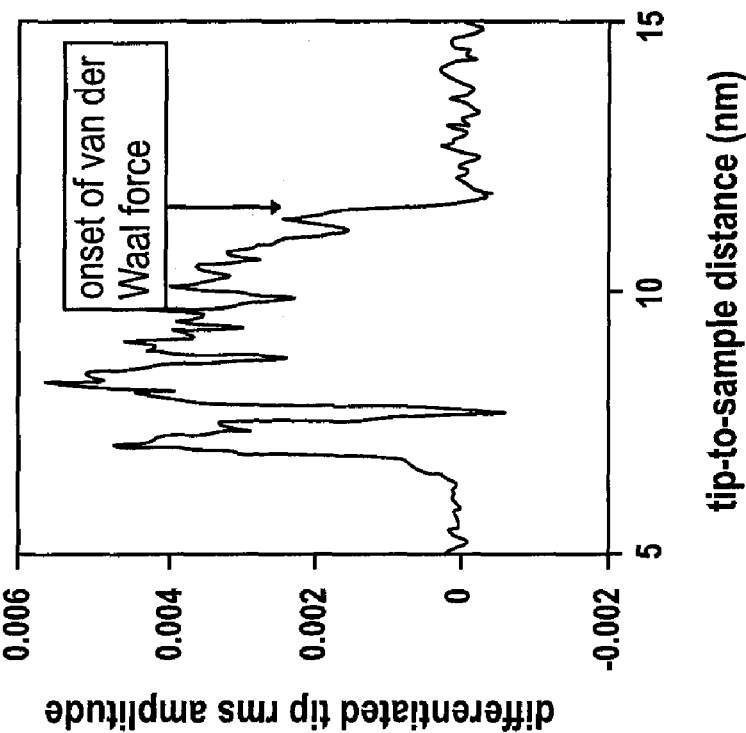
FIG. 7A illustrates a differentiated tip rms amplitude in accordance with an embodiment.

In an alternate embodiment, the initial coarse approach is stopped at a tip-to-sample distance where there is an abrupt reduction in tip amplitude or an abrupt phase change as a function of tip-to sample distance. This point may represent the onset of the van der Waal force and, as shown in FIG. 5A, occurs when the probe tip oscillates about a point that is at a distance $D_1$ from the surface of the sample 512. As further shown in FIG. 5B, at the distance $D_1$, the oscillation amplitude, $A_1$, is significantly less than that of free oscillation. Beginning at the distance $D_1$ and continuing to an unknown distance less than $D_1$, the tip amplitude will decrease as a monotonic function of tip-to-sample distance. Abrupt changes in phase or amplitude may be more easily detected by differentiating the amplitude signal, as shown in FIG. 7A, or phase signal, as shown in FIG. 7B. Again, depending on the strength of the response between the tip and sample, the detection signal to noise ratio, etc., the distance $D_1$ may vary slightly. Thus, in this embodiment, during the initial tip approach operation 404, the tip moves toward the sample to the unknown distance $D_1$ within the attractive force regime or at the fringe of the attractive force regime. With either approach, at the end of the tip approach operation 402, the fine approach mechanism (e.g. the z scanner 328) is ideally at the center of its motion range.

At operation 404, the feedback mechanism 320 is enabled with an initial amplitude setpoint corresponding to the tip amplitude determined from the initial tip approach operation 402. At this point in the method, the tip has not contacted the sample and therefore the feedback mechanism has been turned on before the absolute tip-to-sample distance is known. For example, the feedback setpoint may be initially set to $A_1$. With the feedback mechanism 320 enabled, the feedback setpoint is maintained, thereby maintaining the tip at a distance $D_1$ from the sample even though the distance $D_1$ is not yet a known quantity. The relative position of the tip can be monitored by recording the z-height of the cantilever as output by the z-translation controller 324. With the feedback mechanism enabled, any drift or perturbation during the method may be accounted for to reduce the possibility of the tip crashing into the sample. As previously noted, for embodiments where the feedback setpoint is based on tip oscillation phase rather than amplitude, a phase feedback setpoint may be similarly modulated to affect a reduction in the tip-to-sample distance.

In operation 406, the tip-to-sample distance is reduced by adjusting the feedback amplitude setpoint 340 rather than directly adjusting sample stage or cantilever z-height (as was described for the coarse approach). Assuming adequate control circuitry, the actual measurement signals serving as inputs to the feedback mechanism and the feedback setpoint 340 become substantially equivalent. Where the initial coarse approach positioned the tip close enough for the amplitude to have a predictable response (e.g. a monotonic reduction in amplitude with decreasing distance), a reduction in the feedback setpoint 340 may provide a reduction the tip-to-sample distance. In a particular embodiment, the feedback setpoint is reduced by a fixed step size. In another embodiment, the feedback setpoint is reduced from the current setpoint by a step size dependent on the current feedback setpoint. For example, as the tip amplitude setpoint becomes smaller, so to may the reduction in the setpoint.

Once the new feedback setpoint is selected, the z-translation controller 324 will drive the cantilever z scanner 328 in an effort to achieve the reduced setpoint. In one embodiment, the z-translation controller 324 will utilize the phase or amplitude versus relative z-height data collected for a previous feedback setpoint or that collected during the coarse tip approach operation 402 to estimate the size of the z-height increment to attempt to achieve the setpoint. Rather than setting the cantilever z-height as an independent variable and driving to a z-height while recording the amplitude signals, the recorded amplitude signals are used by the feedback system to drive toward a particular amplitude setpoint with the relative z-height as a dependent variable. Because the feedback system is used, the drive to the reduced setpoint may be done in a manner dependent on a previously determined function of amplitude versus z-height increment. For example, after either the coarse approach or a previous reduction in the feedback setpoint, a change in amplitude as a function of a change in z-height may be utilized to select a z-height increment for the setpoint. With the feedback mechanism in place any over-increment or under-increment of the z-height causes the feedback mechanism to loop in an effort to reach the reduced feedback setpoint. This may have the advantage of increasing the rate at which the recorded phase and amplitude values are utilized during the tip approach relative to a conventional method.

While the tip-to-sample distance is reduced by a reduction in the feedback setpoint, the phase of the tip oscillation as detected by the phase detector 316 may be monitored and stored in operation 408. For some embodiments, the phase of interest may be the phase difference between the requested free oscillation amplitude signal input to the tip oscillator 306 and the oscillation at the end of the probe tip 302 as detected by the deflection detector 308.

At operation 409, in addition to recording the tip oscillation phase and the tip oscillation amplitude setpoint (or equivalently the measured amplitude input of the feedback mechanism), the z-height of the cantilever as output by the z-translation controller 324 is also recorded. Storing of the z-height enables both the phase and the tip amplitude to be determined as a function of the z-height required to maintain a particular feedback setpoint. For example, referring to FIG. 5A, assuming the coarse tip approach was terminated at distance $D_0$ from the sample 512, a reduction in feedback setpoint to $A_1$ would result in the z-translation controller 324 reducing z-height by the amount $Z_1$. Therefore, the increment $Z_1$ from $D_0$ can be determined to correspond to the feedback setpoint $A_1$ and the phase $\Psi_1$. It should be apparent that at this point in the method the probe tip 302 has still not yet contacted the sample 312 and therefore is in a condition optimal for accurate and precise non-contact regime measurement. Even though the actual tip-to-sample distance $D_1$, has not yet been determined, the present method enables construction of a relative F/D curve on the basis of the cantilever z-height corresponding the feedback setpoint (amplitude $A_1$).

At operation 410, the phase recorded in operation 408 is compared to a phase threshold. In one embodiment, the phase threshold is a sudden change in phase. In one such embodiment, the phase changes polarity. For some embodiments, the phase signal may be differentiated as a function of the feedback setpoint (amplitude) or the recorded z-height (relative tip-to-sample distance), and in this case, the differentiated function may be monitored for discontinuities typically accompanied with changes in polarity. In either case, the sudden changes may be indicative of a switch from a pure attractive interaction to a somewhat repulsive interaction as explained elsewhere herein.

If the phase threshold is not met at operation 410, then the process is repeated beginning with operation 406 to iteratively reduce the feedback setpoint, for example to $A_n$ as shown in FIG. 5A. At each new feedback setpoint, the phase, $\Psi_n$, is recorded as a function of the relative cantilever z-height movement, $Z_n$, until the phase threshold is detected at operation 410. If at operation 412 averaging will be done to account for drift between the cantilever and the sample, then the feedback setpoint may be swept back to a higher feedback setpoint, as described elsewhere herein.

Figure 5C:
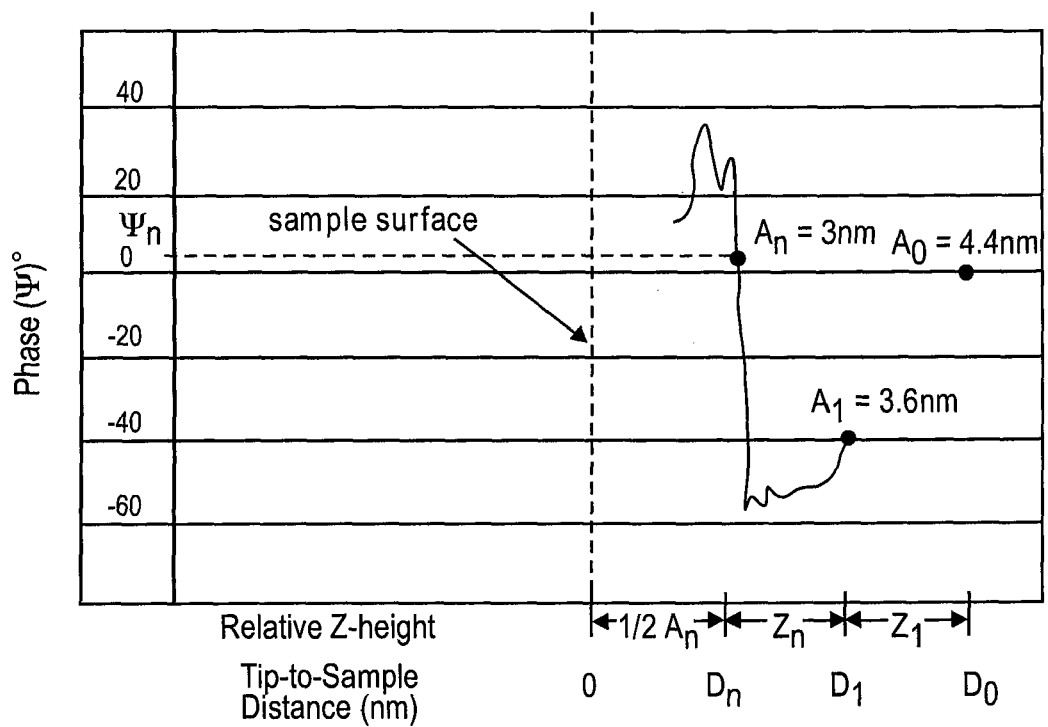
FIG. 5C is a graph of phase in degrees and amplitude in nanometers (nm) as a function of tip-to-sample distance in nanometers corresponding to the phase vs. amplitude feedback graph of FIG. 5B, according to one embodiment of the present invention.

If the feedback setpoint is not to be swept multiple times for averaging purposes at operation 412, upon meeting the phase threshold at operation 410, the critical feedback setpoint may then be determined and amplitude or phase values may be characterized prior to making contact with the sample across the entire non-contact regime as a function of tip-to-sample distance. At operation 413, in an embodiment where the phase threshold is a phase reversal indicating initial sample contact, the recorded z-heights are offset by one half the tip oscillation amplitude at the phase threshold. As shown in FIG. 5A, after the cantilever z-height movement, $Z_n$, the tip 502 begins to make intermittent contact with the sample 512, thereby inducing the phase reversal. The known amplitude, $A_n$, may be divided by in half to establish a correlation between the absolute distance $D_n$, from the midpoint of the cantilever to the sample surface, and the relative z-height ($Z_0$-$Z_1$ . . . -$Z_n$). The relative z-height corresponding to $A_n$ is set equal to the distance $D_n$. Because the relative z-height movement is known between each feedback setpoint iteration, every z-height increment may be correlated to the tip-to-sample distance by adding one half the tip oscillation amplitude at the phase threshold (critical setpoint) to offset or calibrate each z-height increment. With the z-height offset, $D_n$, known from operation 412, the amplitude and phase values recorded prior to meeting the phase threshold may be determined as a function of the tip-to-sample distance ($D_{n-1}$, $D_1$, $D_0$, etc) at operation 414. As shown in FIG. 5C, the phase versus tip-to-sample distance curve comprising $A_n$ and $\Psi_n$, at $D_n$ (equal to ½ $A_n$), $A_1$ and $\Psi_1$ at $D_1$ (equal to ½ $A_n$+$Z_n$) and $A_0$ and $\Psi_0$ $D_0$ (equal to ½ $A_n$+$Z_n$+$Z_1$) is determined and a continuous function approximating curves of the phase and/or amplitude versus tip-to-sample distance may be obtained.

At operation 430 the method may be ended with the feedback mechanism enabled during the final approach to the sample, such that overdrive of the tip into the sample may be avoided. Similarly, with the recordation of the relative z-height corresponding to each feedback setpoint (as well as positions there between), all phase and amplitude measurements taken prior to the tip contacting the surface may be correlated to upon a subsequent sample contact event to generate an amplitude versus distance curve.

Returning to the condition where a feedback setpoint sweep is employed, at operation 415 the process determines if a threshold number of feedback sweeps has been performed. If the threshold number is not met, in one embodiment the feedback setpoint is increased to induce and increase in the tip-to-sample distance at operation 416. Operation 416 may be performed in a manner analogous to that of operation 406 previously discussed. At the new feedback setpoint, the tip oscillation phase, amplitude and cantilever z-height are again recorded to a memory at operation 417. In a further embodiment, phase and/or amplitude are not recorded while the tip is being raised away from the sample to avoid averaging in hysteresis effects.

If the upper bound of the feedback setpoint sweep is not met at operation 419, then the process proceeds to operation 416 to increment the feedback setpoint again. If however, the upper bound of the sweep is met, then the process proceeds to operation 406 to repeat the final tip approach from the upper bound back toward the sample surface. In one embodiment, the upper bound of the sweep is greater than the critical setpoint. In a particular embodiment, the upper bound of the setpoint sweep is equal to the tip amplitude at the onset of van der Waal force onset ($A_1$). In an alternate embodiment, the feedback setpoint is incremented to a known value, such as $A_0$. In certain embodiments, the feedback setpoint sweep is preferably performed at a rate of between 1 to 2 Hz, but as high as 10 Hz, depending on the noise characteristics of the system. In further embodiments, the number of sweeps is between 5 and 20, again depending on the noise characteristics.

After the number of sweeps has met the threshold number of sweeps at operation 415, the process proceeds to operation 421 and averages the measurements taken over the plurality of sweeps. Averaging over the plurality of sweeps may advantageously reduce the effects of drift between the sample 312 and the cantilever z scanner 328.

Figure 6A:
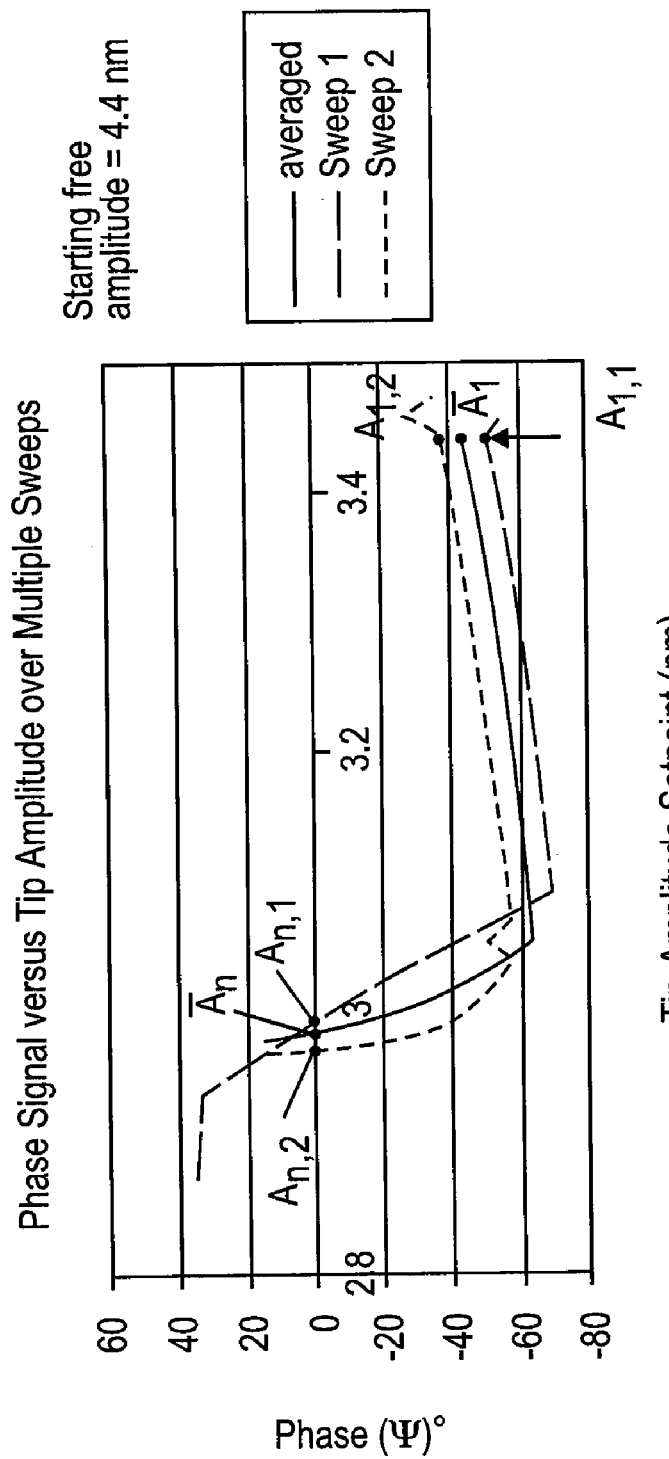
FIG. 6A is a graph of phase in degrees as a function of amplitude feedback setpoint in nanometers corresponding to a plurality of feedback setpoint sweeps.
Figure 6B:
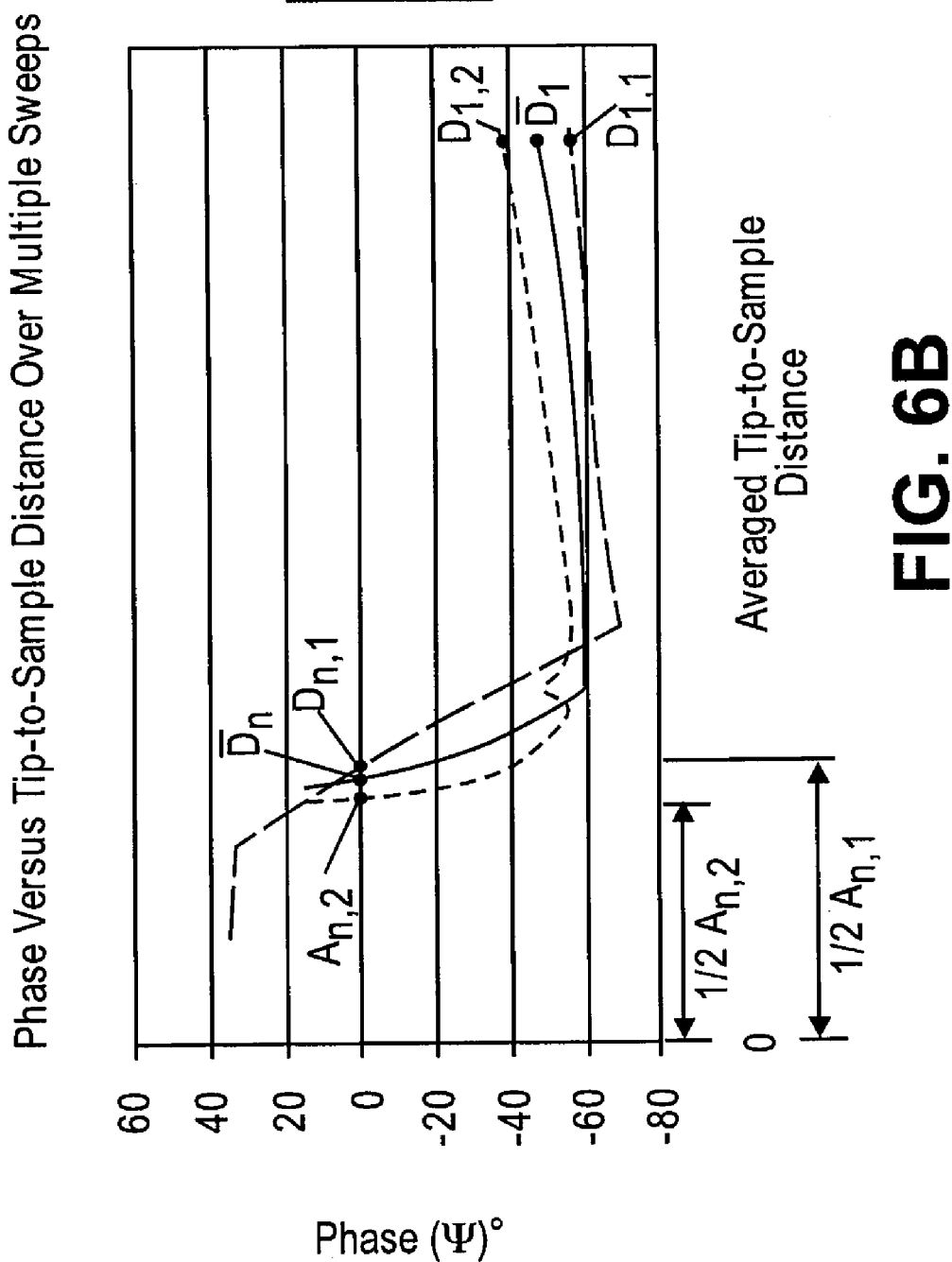
FIG. 6B is a graph of phase in degrees as a function of tip-to-sample distance in nanometers corresponding to a plurality of feedback setpoint sweeps

In one embodiment, a curve fitting routine is applied to generate a function which averages the phase versus tip-tosample distance curves across the plurality of sweeps. As shown in FIG. 6A, two phase vs. tip amplitude setpoint curves are shown along with an averaged curve. Sweep 1 includes amplitude $A_{1,1}$ at the onset of van der Waal force and $A_{n,1}$ at the phase threshold. Sweep 2 similarly includes amplitudes $A_{1,2}$, and $A_{n,2}$, respectively. An averaged critical feedback setpoint, $\overline{A}_n$ as well as an averaged phase versus tip-to-sample distance curve and an averaged amplitude versus tip-to-sample distance curve may then be generated. For example, a commonly known curve fitting function may be used. As shown in FIG. 6B, an average distance, $\overline{D}_n$ may be assigned the average of one half $A_{n,1}$ and one half $A_{n,2}$ (i.e. average of $D_{n,1}$ and $D_{n,2}$). In another embodiment, every z-height increment of the fitted curve is then correlated to the tip-to-sample distance by offsetting every z-height increment in the fitted curve by the average $\overline{D}_n$ at operation 423 to generate the curves as a function of average tip-to-sample distance at operation 425, as shown in FIG. 6B.

In an further embodiment where feedback setpoint sweeps are employed to reduce the effects of drift, the section of the plot in FIGS. 6A and 6B corresponding to distances greater than the critical feedback setpoint ($A_n$) can be obtained first by limiting the lowest set-point during the sweep to be larger than the critical setpoint. For example, in one such embodiment, a number of sweeps are performed after a threshold number of critical feedback setpoints have been recorded without meeting the phase threshold. The lower bound of the sweep may be selected to be the smallest of these feedback setpoints and the upper bound selected to correspond to the onset of van der Waal force. After a number of sweeps in this range, the attractive force interaction may be determined more precisely with the benefit of averaging over the sweeps. Then, the feedback setpoint can be lowered further to reach the critical setpoint thereby identifying the tip-to-sample distance (absolute distance). All measurements taken over the sweeps above the critical setpoint may then be calibrated to provide the amplitude and phase data as a function of tip-to-sample distance. In another embodiment, with each reduction in the feedback setpoint, at least one sweep back up to an upper bound is performed to re-characterize the non-contact regime and average out drift before the feedback setpoint is further reduced at operation 406 during another iteration. In this manner, effects of drift can be reduced with each iteration prior to making any contact with the sample. In such an embodiment, the non-contact regime may be characterized as a function of relative cantilever z-heights prior to the tip ever contacting the surface. Then, after these non-contact regime measurements are made, determination of the critical setpoint facilitates calibrating the relative measurements to the actual tip-to-sample distance. Upon determination of the phase recorded (or amplitude recorded, etc.) as a function of the average tip-to-sample distance, the method then ends at operation 430.

Portions of the present invention may be provided as a computer program product, which may include a computer-readable medium having stored thereon instructions, which when executed by a computer (or other electronic devices), cause an AFM to approach a probe tip to a sample surface with a feedback mechanism enabled prior to the tip having contacted the surface of the sample. In other embodiments, a computer-readable medium has stored thereon instructions, which when executed by a computer (or other electronic devices), cause an AFM to record phase and/or amplitude as a function of relative cantilever z-height, subsequently approach the surface to initiate sample contact with the probe tip to establish a critical feedback setpoint, then correlate the relative z-heights to absolute tip-to-sample distance to determine the phase and/or amplitude values recorded prior to the tip contacting the surface as a function of tip-to-sample distance. In a further embodiment, a computer-readable medium has stored thereon instructions, which when executed by a computer (or other electronic device), cause the AFM to sweep the feedback setpoint from an upper bound greater than the critical setpoint to a lower bound no less that the critical setpoint to determine an averaged function of phase and/or amplitude versus tip-to-sample distance. In still another embodiment, a computer-readable medium has stored thereon instructions, which when executed by a computer (or other electronic devices), cause the AFM to sweep the feedback setpoint from an upper bound greater than the critical setpoint to a lower bound greater than the critical setpoint to determine an averaged function of phase and amplitude versus relative z-height, and then reduce the lower bound of the sweep to identify the critical setpoint and correlate the previously recorded relative z-heights to the tip-to-sample distance. The computer-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other commonly known type computer-readable medium suitable for storing electronic instructions. Moreover, the present invention may also be downloaded as a computer program product, wherein the program may be transferred from a remote computer to a requesting computer over a wire.

Although the present invention has been described in language specific to structural features and/or methodological acts, it is to be understood that the invention defined in the appended claims is not necessarily limited to the specific features or acts described. The specific features and acts disclosed are to be understood as particularly graceful implementations of the claimed invention in an effort to illustrate rather than limit the present invention.

What is claimed is:

1. A method of determining a tip vibration amplitude as a function of a tip-to-sample distance in an atomic force microscope (AFM), the method comprising:
providing a sample on a stage of the AFM;
inducing a tip coupled to a cantilever of the AFM to vibrate;
enabling a feedback mechanism prior to the tip contacting the sample;
iteratively reducing a tip vibration amplitude setpoint of the feedback mechanism to reduce the tip-to-sample distance while recording a tip vibration phase as a function of a relative z-height of the cantilever until the phase meets a threshold;
correlating the relative z-height to the tip-to sample distance; and
determining the recorded phase as a function of the tip-to-sample distance.

2. The method of claim 1, wherein correlating the relative z-height further comprises offsetting the recorded relative z-height by one half of the tip vibration amplitude at the phase threshold.

3. The method of claim 1
wherein the tip vibration amplitude is recorded as a function of the relative z-height while the tip vibration amplitude setpoint of the feedback mechanism is reduced.

4. The method of claim 3, wherein the recorded relative z-height is offset by one half of the tip vibration amplitude at the phase threshold to correlate the recorded relative z-height to the tip-to-sample distance; and
wherein the tip vibration amplitude recorded prior to meeting the phase threshold is determined as a function of the tip-to-sample distance.

5. The method of claim 1, wherein for each iteration, the feedback mechanism reduces the relative z-height by an amount dependent on an amplitude of recorded for a previous setpoint, or by an amount dependent on a tip vibration amplitude reduction caused by a relative z-height reduction made in a previous iteration.

6. The method of claim 5, wherein for each iteration, the feedback mechanism reduces the relative z-height by an amount dependent on the amount by which the relative z-height reduction made in a previous iteration reduced the tip amplitude.

7. The method of claim 1, wherein the phase threshold is based on a rate of change in phase or a reversal of the phase and the corresponding feedback setpoint is the critical amplitude setpoint.

8. The method of claim 7, further comprising:
sweeping the tip vibration amplitude setpoint of the feedback mechanism from a lower bound that is no smaller the critical amplitude setpoint to an upper bound that is greater than the critical amplitude setpoint;
reducing the tip vibration amplitude setpoint of the feedback mechanism from the upper bound to the lower bound to complete the sweep;
recording the tip vibration phase as a function of the relative z-height of the cantilever while performing the sweep;
averaging the recorded phase or amplitude as a function of the relative z-height of the cantilever; and
correlating the recorded relative z-height to a tip-to-sample distance after recording the tip vibration phase or amplitude as a function of the relative z-height to characterize an attractive force interaction in a non-contact regime as a function of tip-to-sample distance.

9. The method of claim 8, further comprising:
determining a recorded tip vibration amplitude for the plurality of sweeps as a function of the average tip-to-sample distance to characterize an attractive force interaction in a non-contact regime.

10. The method of claim 8, wherein the sweeping of the tip vibration amplitude setpoint is performed at a rate of about 1 Hz to about 10 Hz.

11. The method of claim 8, wherein the sweeping of the tip vibration amplitude setpoint is performed at least 5 times the x-y position of the sample relative to the tip is maintained between sweeps of the z-height.

12. The method of claim 8, further comprising sweeping the feedback setpoint between the lower bound and the upper setpoint more than once, wherein the lower bound of each sweep is reduced relative to the prior sweep until the phase threshold is met.

13. A non-transitory computer medium having a set of instructions stored thereon which, when executed by a system processor, cause the system to perform the method of claim 1.

14. The medium of claim 13, further comprising a set of instructions stored thereon which, when executed by a processor, cause the system to perform the method further comprising:
correlating the relative z-height to the tip-to-sample distance after recording the tip vibration phase as a function of the relative z-height; and
determining the phase recorded prior to meeting the phase threshold as a function of the tip-to-sample distance to characterize an attractive force interaction in a non-contact regime.

15. The medium of claim 13, wherein correlating the relative z-height further comprises offsetting the recorded relative z-height by one half of the tip vibration amplitude at the phase threshold to correlate the recorded relative z-height to the tip-to-sample distance.

16. An atomic force microscopy system, comprising:
a tip mounted on a cantilever;
a detector mechanism;
a cantilever z-height controller coupled to the cantilever;
a feedback mechanism coupled to the cantilever z-height controller;
one or more processors to automatically adjust a setpoint of the feedback mechanism to modulate a tip-to-sample distance while recording a phase signal from the detector mechanism as a function of the z-height until a phase threshold is detected; and
the one or more processors configured to correlate the recorded z-height to an absolute tip-to-sample distance and to determine the recorded phase signal as a function of absolute tip-to-sample distance.

17. The atomic force microscope of claim 16, wherein the one or more processors are to generate a curve describing an amplitude signal recorded prior to the tip contacting the sample as a function of absolute tip-to-sample distance.

18. The atomic force microscope of claim 16, wherein the one or more processors are to automatically sweep the feedback setpoint between an upper and lower bound to average out the effect of drift between the cantilever and the sample.

19. The atomic force microscope of claim 16, wherein the one or more processors are to reduce the lower bound of the sweep for each successive sweep until the phase threshold is met.

* * * * *